US006188659B1

United States Patent
Mueller et al.

(10) Patent No.: US 6,188,659 B1
(45) Date of Patent: Feb. 13, 2001

(54) METHOD FOR INSURING UNIQUENESS OF AN ORIGINAL CD

(75) Inventors: William J. Mueller, West Henrietta; Robert V. Reisch, Fairport, both of NY (US); Bane V. Vasic, Allentown, PA (US)

(73) Assignee: Eastman Kodak Company, Rochester, NY (US)

( * ) Notice: Under 35 U.S.C. 154(b), the term of this patent shall be extended for 0 days.

(21) Appl. No.: 09/211,763

(22) Filed: Dec. 15, 1998

Related U.S. Application Data

(60) Provisional application No. 60/071,929, filed on Jan. 20, 1998.

(51) Int. Cl.⁷ .................................................. G11B 7/00
(52) U.S. Cl. .............................. 369/59; 369/58; 369/47
(58) Field of Search .................................. 369/47, 48, 49, 369/50, 54, 58, 59; 360/48, 51, 53

(56) References Cited

U.S. PATENT DOCUMENTS

| | | | |
|---|---|---|---|
| 5,703,858 | * 12/1997 | Mitchell et al. | 369/58 |
| 5,815,484 | * 9/1998 | Smith et al. | 369/47 X |
| 5,881,038 | * 3/1999 | Oshima et al. | 369/59 |

OTHER PUBLICATIONS

Bruce Schneier, Applied Cyptography, 2nd ed., John Wiley & Sons, 1996.

Proposed Federal Information Processing Standard for Secure Hash Standard, Federal Register, vol. 57, No. 21, Jan. 31, 1992, pp. 3747–3749.

Proposed Federal Information Processing Standard for Digital Signature Standard (DSS), Federal Register, vol. 56, No. 169, Aug. 30, 1991, pp. 42980–42982.

Gustavus J. Simmons, Contemporary Cryptology, The Science of Information Integrity, IEEE Press, 1991, pp. 325–378.

Diffie et al, New Directions in Cryptography, IEEE Transactions on Information Theory, vol. IT–22, No. 6, Nov. 1976, pp. 644–654.

* cited by examiner

*Primary Examiner*—Muhammad Edun
(74) *Attorney, Agent, or Firm*—Raymond L. Owens

(57) ABSTRACT

The invention provides a method of proving that a CD is an authorized original by utilizing a unique catalog code that is stored in a sub channel data stream on the CD that is derived using digital signature techniques. The inputs for the unique catalog code are derived from a digital signature algorithm and include, in the case of audio CD, each song's ISRC number, a bar code or unique identifier of the CD and the audio data content. To verify that the CD is not a copy, the original digital signature algorithm used at the time of recording to create the unique catalog code is applied to the audio data and ISRC codes recorded on the disc to derive a catalog code. An authorized original CD will have the same catalog code value stored in the subchannel as the catalog code derived from the digital signature algorithm. If the catalog codes do not match, the disc is determined to be an illegal copy.

18 Claims, 2 Drawing Sheets

METHOD FOR INSURING UNIQUENESS OF AN ORIGINAL CD

CROSS REFERENCE TO RELATED APPLICATION

Reference is made to and priority claimed from U.S. Provisional, Application Serial No. 60/071,929 filed Jan. 20, 1998, entitled "Method for Insuring Uniqueness of Custom Audio CD" by Mueller et al.

FIELD OF THE INVENTION

The invention relates in general to the storage of information on a recordable CD, CD-R or CD-RW and in particular to storage of audio information. Specifically, the relates to a method of insuring the uniqueness of an originally recorded CD, but may also be applied to DVD-R, DVD-RAM as well as stamped CD and DVD.

BACKGROUND OF THE INVENTION

The recording industry is moving toward a new method of distributing content which will allow for creation of original custom CD's either via mail order, from a kiosk located in a retail outlet or by electronic distribution. As a result of this new form of distribution, concerns have arisen within the recording industry that an original custom CD will be replicated by the purchaser and distributed for profit without proper recognition of the original content providers intellectual property rights.

In view of the above, it is an object of the invention to provide a method of proving that a CD is an authorized original and to identify illegal copies of an authorized original.

SUMMARY OF THE INVENTION

The invention provides a method of proving that a CD is an authorized original by utilizing a unique catalog code that is stored in a sub channel data stream on the CD that is derived using digital signature techniques. The inputs for the unique catalog code are derived from a digital signature algorithm and include, in the case of audio CD, each song's ISRC (International Standard Recording Code) number, a bar code or unique identifier of the CD and the audio data content. The ISRC number is assigned by the Recording Industry Association of America (RIAA) for each individual song. To verify that the CD is not a copy, the original digital signature algorithm used at the time of recording to create the unique catalog code is applied to the audio data and ISRC codes recorded on the disc to derive a catalog code. An authorized original CD will have the same catalog code value stored in the subchannel as the catalog code derived from the digital signature algorithm. If the catalog codes do not match, the disc is determined to be an illegal copy.

More specifically, the invention provides a method for insuring uniqueness of a recorded disc, wherein data and a data identifier number, which corresponds to the data, to be recorded on a recording disc is provided, the data is randomly sampled utilizing a sampling function to generate a sampling vector, wherein the sampling function utilizes a unique disc identifier provided on the recording disc to define the random sampling, the sampling vector is concatenated with the data identifier number to form a message, the message is hashed to generate a hash value using a hash function, the hash value is signed with a private key using a signing function to generate a signature, and the data, data identifier number and signature are recorded on the recording disc.

Verification is performed by randomly sampling the data recorded on a recording disc utilizing a verification sampling function to generate a verification sampling vector, wherein the verification sampling function utilizes a unique disc identifier provided on the recording disc to define the random sampling, concatenating the verification sampling vector with the unique disc identifier to form a verification message, hashing the verification message to generate a verification hash value using a verification hashing function, generating a verification value using a verification function that utilizes the verification hash value and the signature recorded on the recording disc, wherein the recording disc is determined to be legitimate if the verification value is equal to the signature.

BRIEF DESCRIPTION OF THE DRAWINGS

The invention will be described in detail with reference to certain preferred embodiments thereof and the accompanying drawings, wherein.

DETAILED DESCRIPTION OF THE PREFERRED EMBODIMENTS

Figure 1:
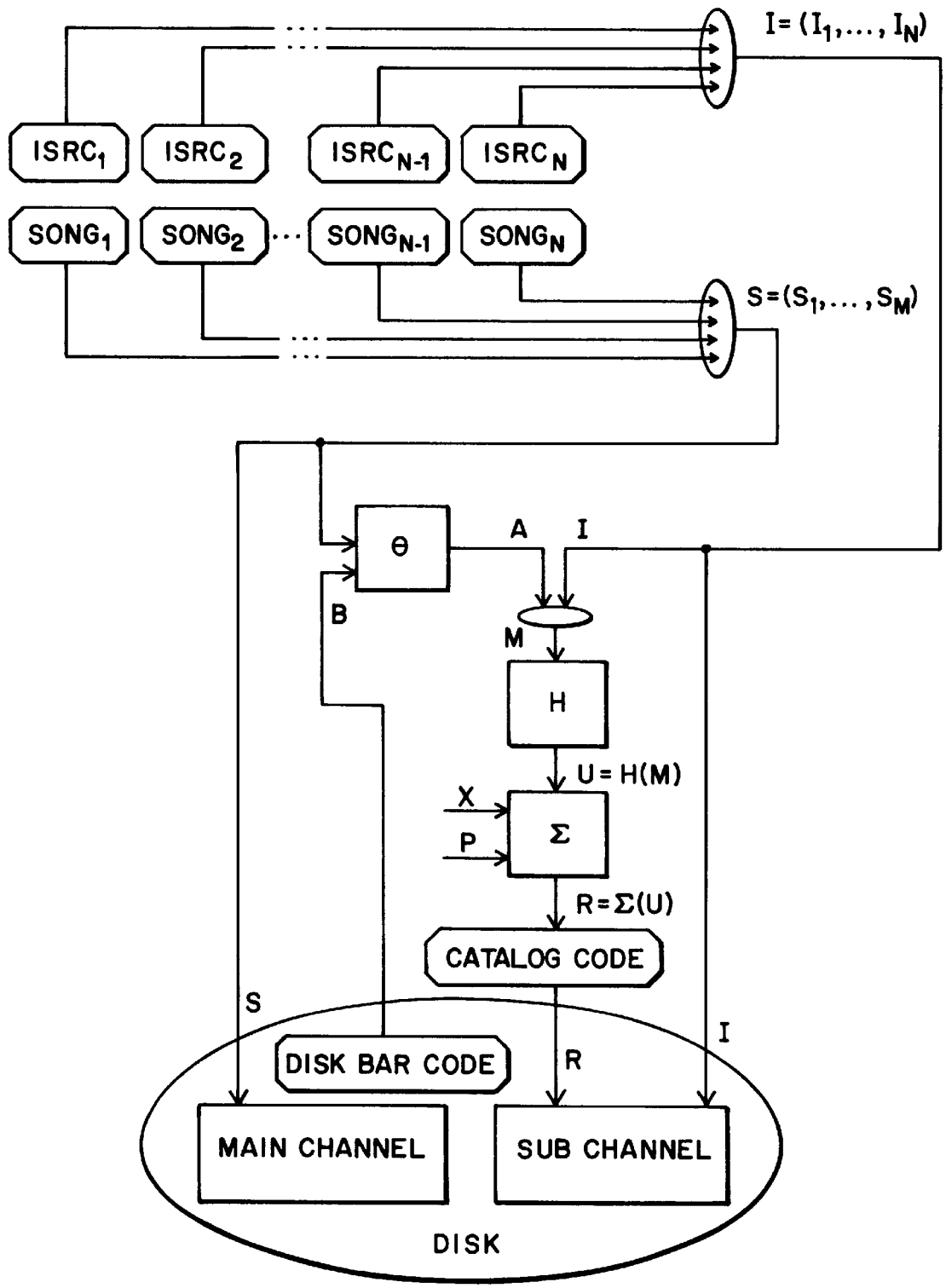
FIG. 1 is an operational block diagram illustrating a disk signing process in accordance with the present invention.

The present invention provides for the writing of a catalog code on a disk which constitutes a signature of the content recorded on a disk. The uniqueness of the signature is due in part to the uniqueness of a bar code provided on the disc. The use of the bar code in conjunction with cryptographic techniques enables original authorized CDs to be identified and distinguished from illegal copies, thereby insuring that the intellectual property rights of the content provider of the material recorded on the CD are protected.

In the following example of a preferred embodiment of the invention, all data will be represented as binary vectors of a certain length. Any of the functions defined will be map sets of binary vectors to another set of binary vectors, possibly of different lengths. The cryptographic notation being used is summarized in Table 1.

TABLE 1

Cryptographic notation

| Symbol | Meaning |
| --- | --- |
| M | Message to be signed |
| H | Hash function |
| U | Hash value, $U = H(M)$ |
| X | Private key |
| Y | Public key |
| P | Vector of public parameters |
| $\Sigma_P$ | Signature function |
| R | Signature, $R = \Sigma_P(U,X)$ |
| $\zeta$ | Verification function |
| V | Verification value $V = \zeta_P(U,R,Y)$ |

The concept of a digital signature and one-way hash function is well known in the art. A one-way hash function H satisfies the following general properties: computation $H(M)$ is feasible, i.e. H is computable in polynomial time; no polynomial time algorithm for calculation of $H^{311}(U)$ is known; given M, it is not computationally feasible to find another message M' so that $H(M)=H(M')$; and probability of choosing two random messages M and M' so that H(M)=H(M') is small. An additional property of this concept is that for any message length l(M), the hash value U=H(M) has same length.

A catalog of one-way hash functions can be found in Applied Cryptography, B. Schneier, John Wiley and Sons, Inc., New York, pp. 229–660, 1996, the contents of which is incorporated herein by reference. An example of a one-way hash function that is preferably utilized in the present invention is a Secure Hash Algorithm (SHA), designed by National Institute of Standards and Technology (NIST) and described in "Proposed Federal Information Processing Standard for secure Hash Standard", Federal Register, Vol. 57, No. 21, January 1992, pp. 3747–3749, the contents of which is incorporated herein by reference, for use with the Digital Signature Standard (DSS) described in "Proposed Federal Information Processing Standard for Digital Signature Standard (DSS)", Federal Register, Vol. 56, No. 169, Aug. 1991, pp. 42980–42982, the contents of which is incorporated herein by reference.

The digital signature utilized for the preferred embodiment of the invention is based on public key cryptography. See, for example, Digital Signatures, C. J. Mitchell et al., Contemporary Cryptology, The Science of Information Integrity, G. J. Simmons, ed., IEEE Press, 1991, pp. 325–378, and also "New Directions in Cryptography", IEEE Transactions on Information Theory, Vol. IT-22, No. 6, Nov. 1976, pp. 644–654, the contents of which are incorporated herein by reference. The procedure of signing a message M is as follows:

1. The author encrypts M by using a signature function $\Sigma_P$. The function itself, i.e. the algorithm used as well as function parameters, given by vector P, are publicly known. Result is a signature $R=\Sigma_P(M)$.

2. The author of the message M, calculates the public key Y from his private key X.

3. M, X, Y and P are made public.

4. The signature R is verified, by using the verification function $\zeta_P$, M, Y. If verification $V=\zeta_P(R,M)$ equals R, then the signature is considered verified.

Usually, instead of message M itself, the hash value U=H(M) is signed. This signing method is as secure as the public key algorithm used.

As a method to track usage of audio content being distributed by satellite digital broadcasts and the Internet, the Recording Industry Association of America (RIAA) is assigning a number known as the ISRC or International Standard Recording Code to individual songs. The ISRC will be electronically logged each time a song is transmitted and the log information will be used to determine royalties.

The ISRC is a 12 digit alphanumeric defined as follows:

| Digit | Definition | Type |
|---|---|---|
| 1 & 2 | Country Code | alphabetic |
| 3, 4, 5 | Owner Code | alphabetic |
| 6 & 7 | Year of recording | numeric |
| 8, 9, 10, 11, 12 | Serial number | numeric |

There exists many methods for etching unique codes such as the ISRC onto a CD in a bar code format during fabrication. Commonly-assigned U.S. Pat. No. 5,706,047 issued to Lentz et al., the contents of which are herein incorporated by reference, discloses a method of forming a bar code in a storage layer of a CD, such that the bar code number can be read by a CD recorder equipped with a bar code read capability. The etching process makes it virtually impossible to tamper with the bar code.

The "Red Book", Compact Disc Digital Audio System Description, N. V. Philips and Sony Corp., June 1989, the specification for audio CDs, defines a location for the ISRC and catalog codes. The "Orange Book", N. V. Philips and Sony Corp., Compact Disc Recordable Part II CD-R and Part III CD-RW Version 1.9 System Description, June 1997, the specification for recordable CDs, defines a method for writing the ISRC and catalog codes to a CD.

In the preferred embodiment of the invention, implemented either as a software processing routine, via hardware implementation or a combination thereof, a unique catalog code using digital signature techniques is created at the time of recording. FIG. 1 illustrates a general explanation of the implementation in accordance with the invention. A bit stream of all songs to be recorded is labeled by S and a stream of all ISRC numbers corresponding to the songs is labeled by I. Samples from the audio stream S are taken in random fashion described by a sampling function $\Theta$, wherein a unique disc identifier, in this case a bar code recorded on the CD, is utilized by the sampling function to define the random sampling. Any desired type of sampling routine may be utilized; wherein any specifically chosen sampling function will depend on the particular application and the amount of system overhead to be devoted to the random sampling. The purpose of random sampling of the audio data is to make the message to be signed longer. The result of the random sampling of the audio data is a vector A. The vector A and I are then concatenated to form message M. Hashing of message M will result in the hash value U=H(M). Hash function H is a conventional function, for example the SHA described above or some other desired conventional function, depending on calculation time requirements. The hash function is necessary to provide the fixed length of a vector U, used in digital signing algorithm. A resulting signature $R=\Sigma_P(M)$ is generated by signing using and author's private key X, and signing function $\Sigma_P$. The signature $R=\Sigma_P(M)$ represents the catalog code and together with S and I is recorded on the disk. S is recorded in a main channel and R and I are recorded in a subchannel, which completes the signing procedure.

In the ideal case one would like to sign the whole content of the disk. Signing the entire content of the disc, however, would be a very time consuming process. Accordingly, the specific processing functions employed are preferably chosen based on the tradeoffs that must be made between encryption overhead and encryption strength for a specific application.

Figure 2:
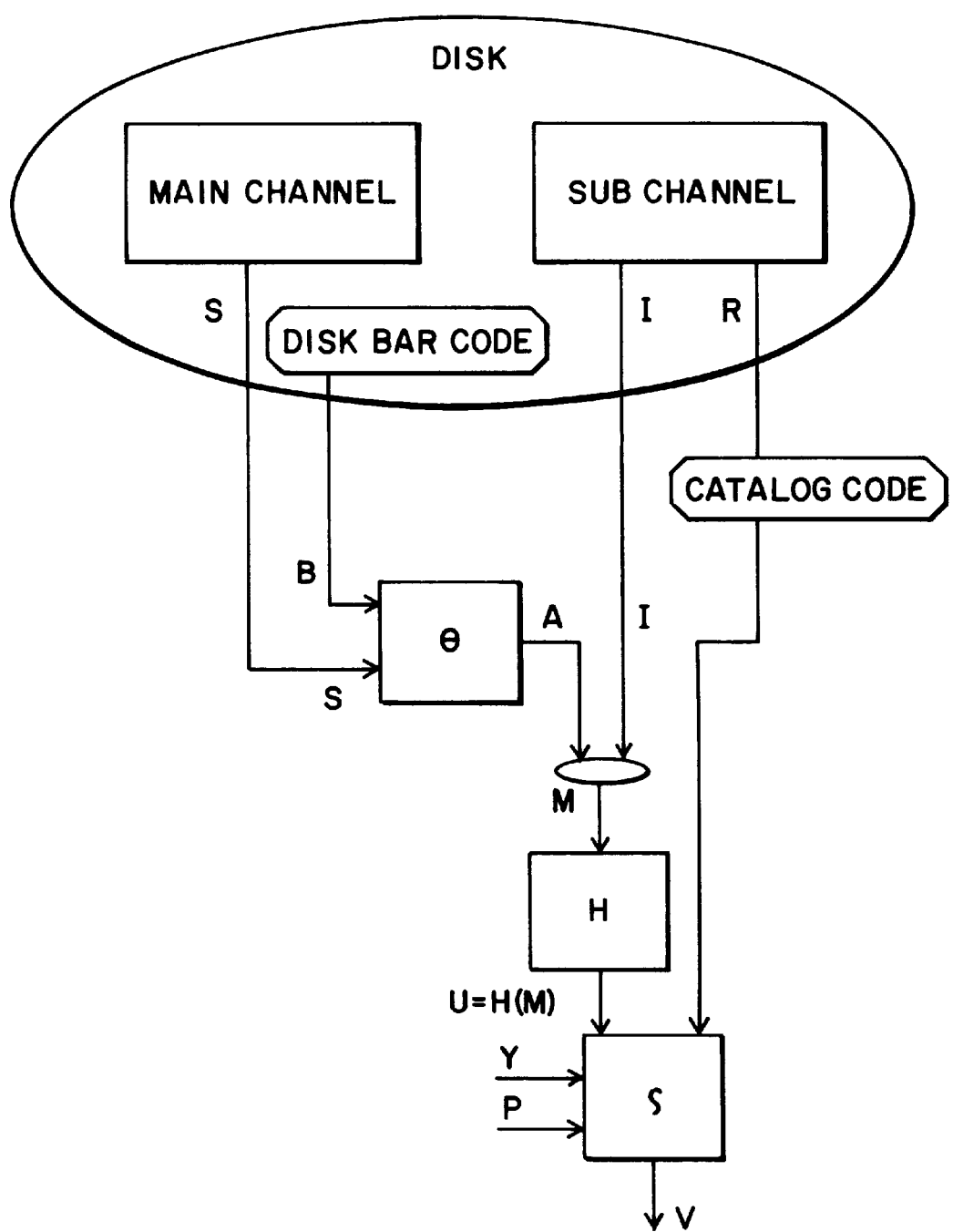
FIG. 2 is an operational block diagram illustrating a signature verification process in accordance with the present invention.

FIG. 2 illustrates a process for checking the uniqueness of a recorded CD-R in accordance with the present invention. The process of verifying disk signature can be incorporated into any reproduction device utilized to read data from a CD. The publicly known parameters, such as the parameters of signature algorithm, set of valid public keys, and the processing routines for the signature verification function are stored a memory of the reproduction device. Random samples are taken using the same selection procedure used during the derivation of the catalog code. As a result of the application of the sampling function $\Theta$, to B and S, the verification sample vector A is obtained. A and I are then concatenated forming message M. Hashing of the verification message M is then performed to generate hash value U=H(M). Inputs of a verifying function $\zeta_P$ are hash value U and signature R. If output V is equal to R, the signature is considered legitimate and the CD-R is determined to be an authorized original recorded CD-R, and if the output V is not equal to R, the signature is considered to be illegitimate and the CD is determined to be an illegal copy. If one wants to create a signature that will be detected as a legitimate in the verifying process (given by $\zeta_P$), it is necessary to know the private key that corresponds to a public key from a set of public keys that are stored.

The invention has been described with reference to certain preferred embodiments thereof. It will be understood, however, that modifications and variations are possible within the scope of the appended claims. For example, although the invention is described with use of a bar code to encode the disc identifier, the invention is applicable to systems employing any type of encoding mechanism. Still further, although the preferred embodiment of the invention is described with reference to recorded audio information, the invention can be utilized for verification of discs containing other types of recorded data.

What is claimed:

1. A method for insuring uniqueness of a recorded disc, said method comprising:
   providing data and a data identifier number, which corresponds to the data, to be recorded on a recording disc;
   randomly sampling the data utilizing a sampling function to generate a sampling vector, wherein the sampling function utilizes a unique disc identifier provided on the recording disc to define the random sampling;
   concatenating the sampling vector with the data identifier number to form a message;
   hashing the message to generate a hash value using a hash function;
   signing the hash value with a private key using a signing function to generate a signature; and
   recording the data, data identifier number and signature on the recording disc.

2. A method as claimed in claim 1, wherein the data is recorded in a main channel of the recording disc and the signature and data identifier number are recorded in a subchannel of the recording disc.

3. A method as claimed in claim 1, wherein the data includes audio data.

4. A method as claimed in claim 3, wherein the data identifier number comprises an International Standard Recording Code.

5. A method as claimed in claim 1, wherein the hash function comprises a Secure Hash Algorithm.

6. A method as claimed in claim 1, wherein the unique disc identifier comprises a bar code provided on the recording disc.

7. A method as claimed in claim 1, wherein the unique disc identifier comprises a bar code provided on the recording disc.

8. A method for insuring uniqueness of a recorded disc, said method comprising:
   randomly sampling data recorded on a recording disc utilizing a sampling function to generate a sampling vector, wherein the sampling function utilizes a unique disc identifier provided on the recording disc to define the random sampling;
   concatenating the sampling vector with the unique disc identifier to form a message;
   hashing the message to generate a hash value using a hashing function; and
   generating a verification value using a verification function that utilizes the hash value and a signature recorded on the recording disc, wherein the recording disc is determined to be legitimate if the verification value is equal to the signature.

9. A method as claimed in claim 8, wherein the data is recorded in a main channel of the recording disc and the signature and data identifier number are recorded in a subchannel of the according disc.

10. A method as claimed in claim 9, wherein the data identifier number comprises an International Standard Recording Code.

11. A method as claimed in claim 8, wherein the data includes audio data.

12. A method as claimed in claim 8, wherein the hash function comprises a Secure Hash Algorithm.

13. A method as claimed in claim 8, wherein the unique disc identifier comprises a bar code provided on the recording disc.

14. A method for insuring uniqueness of a recorded disc, said method comprising:
   a disk signing method including:
      providing data and a data identifier number, which corresponds to the data, to be recorded on a recording disc;
      randomly sampling the data utilizing a sampling function to generate a sampling vector, wherein the sampling function utilizes a unique disc identifier provided on the recording disc to define the random sampling;
      concatenating the sampling vector with the data identifier number to form a message;
      hashing the message to generate a hash value using a hash function;
      signing the hash value with a private key using a signing function to generate a signature; and
      recording the data, data identifier number and signature on the recording disc; and
   a disc verification method including:
      randomly sampling the data recorded on a recording disc utilizing the sampling function to generate a verification sampling vector;
      concatenating the verification sampling vector with the unique disc identifier to form a verification message;
      hashing the verification message to generate a verification hash value using a verification hashing function; and
      generating a verification value using a verification function that utilizes the verification hash value and the signature recorded on the recording disc, wherein the recording disc is determined to be legitimate if the verification value is equal to the signature.

15. A method as claimed in claim 14, wherein the data is recorded in a main channel of the recording disc and the signature and data identifier number are recorded in a subchannel of the recording disc.

16. A method as claimed in claim 14, wherein the data includes audio data.

17. A method as claimed in claim 14, wherein the data identifier number comprises an International Standard Recording Code.

18. A method as claimed in claim 14, wherein the hash function comprises a Secure Hash Algorithm.

* * * * *